United States Patent
Rumler et al.

(10) Patent No.: US 10,390,284 B2
(45) Date of Patent: Aug. 20, 2019

(54) SYSTEMS AND METHODS FOR WIRELESS COMMUNICATION OF HVAC DEVICES

(71) Applicant: Johnson Controls Technology Company, Plymouth, MI (US)

(72) Inventors: Daniel R. Rumler, New Berlin, WI (US); Daniel J. Spacek, Cudahy, WI (US); Isaac J. Krull, Glendale, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 154 days.

(21) Appl. No.: 15/584,931

(22) Filed: May 2, 2017

(65) Prior Publication Data

US 2017/0343231 A1 Nov. 30, 2017

Related U.S. Application Data

(60) Provisional application No. 62/331,418, filed on May 3, 2016.

(51) Int. Cl.
*H04W 40/24* (2009.01)
*G05B 15/02* (2006.01)
*H04L 12/28* (2006.01)
*H04L 29/08* (2006.01)
*H04L 29/06* (2006.01)
(Continued)

(52) U.S. Cl.
CPC ........... *H04W 40/248* (2013.01); *F24F 11/30* (2018.01); *F24F 11/62* (2018.01); *G05B 15/02* (2013.01); *H04L 12/2816* (2013.01); *H04L 12/2827* (2013.01); *H04L 67/125* (2013.01); *H04L 69/18* (2013.01); *F24F 2110/10* (2018.01); *H04L 2012/2841* (2013.01)

(58) Field of Classification Search
CPC ... F24F 11/30; F24F 2110/10; H04L 12/2816; H04L 12/2827; H04L 67/125; H04L 69/18; H04L 2012/2841
See application file for complete search history.

(56) References Cited

U.S. PATENT DOCUMENTS 9,477,239 B2 * 10/2016 Bergman ............... G05D 23/19
2013/0140016 A1 * 6/2013 Storm ................ G05D 23/1934
165/205

(Continued)

*Primary Examiner* — Ankur Jain
(74) *Attorney, Agent, or Firm* — Foley & Lardner LLP

(57) ABSTRACT

A wireless monitoring system for a Building Management System (BMS). The system includes a sensing device. The sensing device is configured to sense a value of an attribute associated with the BMS. The system further includes a wireless communication module in communication with the sensing device. The wireless communication module is configured to receive one or more sensed values transmitted from the sensing device to one or more inputs of the wireless communication module. The wireless communication module is further configured to wirelessly transmit the received sensed values at predetermined intervals via a wireless protocol. The system further includes a wireless transceiver in communication with a BMS controller. The wireless transceiver is configured to receive the transmitted values from the wireless communication module, and to communicate the received values from the wireless communication module to the BMS controller.

20 Claims, 7 Drawing Sheets

(51) Int. Cl.
　　　*F24F 11/30*　　(2018.01)
　　　*F24F 11/62*　　(2018.01)
　　　*F24F 110/10*　(2018.01)

(56) References Cited

U.S. PATENT DOCUMENTS

2015/0108901 A1* 4/2015 Greene .............. H05B 37/0218
　　　　　　　　　　　　　　　　　　　　　　315/149
2015/0287310 A1* 10/2015 Deliuliis ................ H04W 4/90
　　　　　　　　　　　　　　　　　　　　　　340/628

* cited by examiner

SYSTEMS AND METHODS FOR WIRELESS COMMUNICATION OF HVAC DEVICES

CROSS-REFERENCE TO RELATED APPLICATIONS

This application claims the benefit of and priority to U.S. Provisional Patent Application No. 62/331,418 filed May 3, 2016, the entirety of which is incorporated by reference herein.

BACKGROUND

The present disclosure relates generally to building management systems. The present disclosure relates more particularly to systems and methods for using a wireless interface module to allow for wireless communication from various BMS monitoring devices to one or more BMS controllers.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

Currently, the wireless capabilities of wireless networks, and specifically ZigBee wireless networks, is that the wireless network is limited to units (i.e. monitoring devices) with dedicated sensing built-in, such as thermostats and other sensors. These sensors measure attributes of a BMS system such as temperature, humidity, and occupancy. However, many non-wireless sensors, such as pressure sensors, current sensors, etc. still require a hard-wired connection back to a controller. In certain situation, this can require significant cost to install and maintain certain sensors. For example, many building management systems require two-thirds static pressure line measurements inside different portions of the HVAC ducting. This requires a pressure sensor to be placed within the HVAC ducting approximately two-thirds of the length of the ducting from a respective air supply unit, such as an air handling unit (AHU). This can require substantial material and labor cost to install the sensor, and wire the sensor back to a BMS controller. It would therefore be advantageous to be able to adapt the current wired sensors and other monitoring devices to have wireless communication capabilities.

SUMMARY

One implementation of the present disclosure is a wireless monitoring system for a Building Management System (BMS). The system includes a sensing device. The sensing device is configured to sense a value of an attribute associated with the BMS. The system further includes a wireless communication module in communication with the sensing device. The wireless communication module is configured to receive one or more sensed values transmitted from the sensing device to one or more inputs of the wireless communication module. The wireless communication module is further configured to wirelessly transmit the received sensed values at predetermined intervals via a wireless protocol. The system further includes a wireless transceiver in communication with a BMS controller. The wireless transceiver is configured to receive the transmitted values from the wireless communication module, and to communicate the received values from the wireless communication module to the BMS controller.

A further implementation of the present disclosure is a system for remotely sensing a static pressure in an HVAC system. The system includes a static pressure sensing device positioned within an air handling duct associated with the HVAC system. The system further includes a wireless communication module in electronic communication with the static pressure sensing device and configured to receive a sensed pressure value from the static pressure sensing device via an input of the wireless communication module. The wireless communication module is further configured to transmit the received pressure value via a wireless protocol. The wireless communication module is further configured to read the sensed pressure value via the input at predetermined intervals.

Another implementation of the present disclosure is a wireless communication module for providing wireless communication to HVAC equipment. The wireless communication module includes a wireless radio, a power supply, one or more analog inputs in communication with the HVAC equipment, and one or more binary inputs in communication with the HVAC equipment. The wireless communication module further includes a processing circuit having a processor. The processor is configured to operate the wireless module in a low power mode during a predetermined interval. The processor is further configured to operate the wireless communication module in a standard operation mode at the end of the predetermined interval, and read a value of the HVAC equipment at the analog input. The processor is also configured to transmit the read value via the wireless radio using a wireless protocol, and instantly transition from the low power mode to the standard operation mode when a value change is detected at the binary input. The processor further configured to transmit the binary value change via the wireless radio.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for transmitting data from BMS devices wirelessly, according to various exemplary embodiments. The systems and methods described herein may be used to wireless communication capabilities to building management system (BMS) devise that currently communicate over a wired connection only. By providing a wireless interface capable of receiving and transmitting analog and digital values, the BMS devices can communicate directly to a BMS controller via a wireless connection, thereby eliminating the need for a wired connection between the BMS device and the BMS controller.

Building Management System and HVAC System

Figure 1:
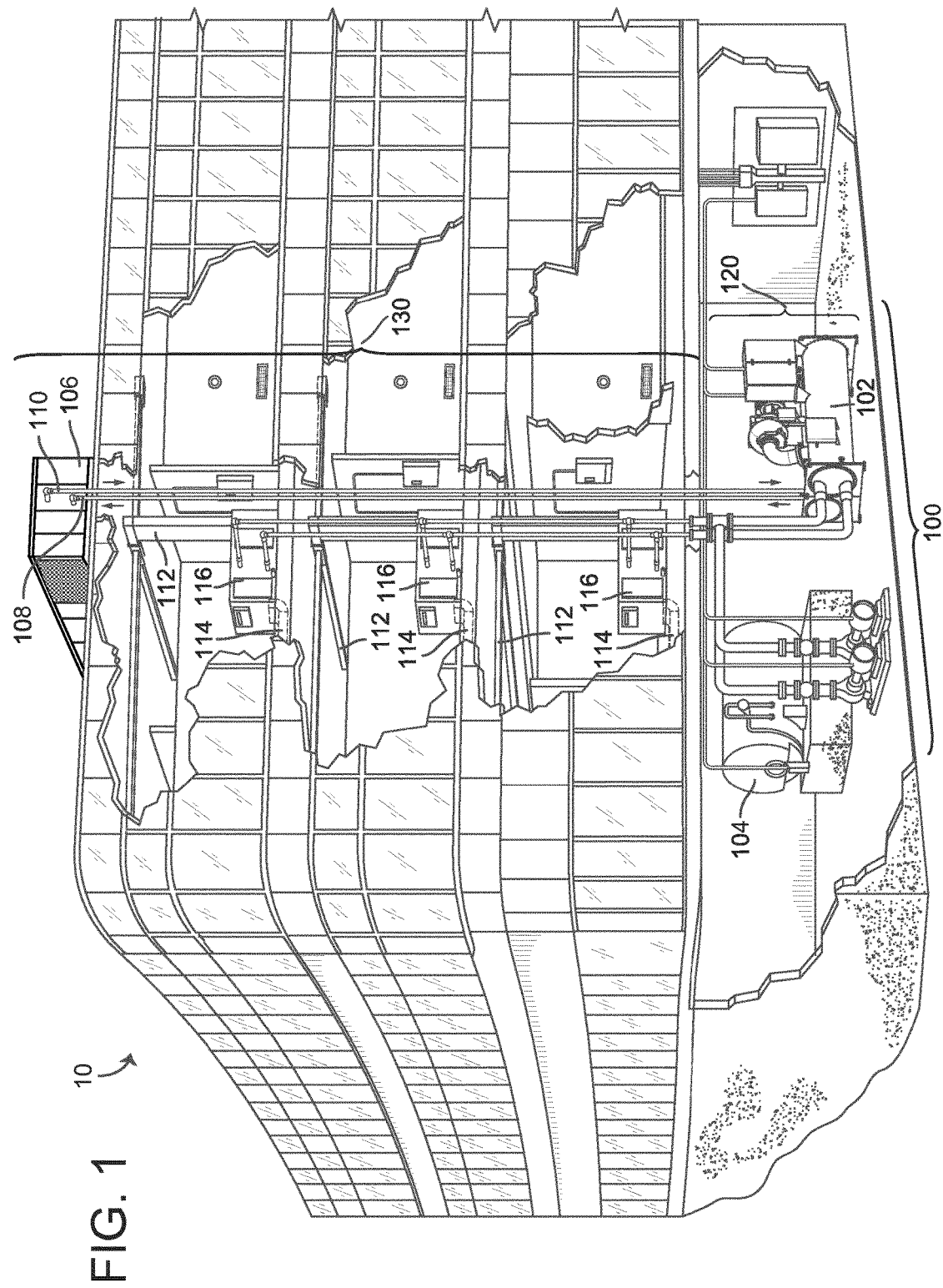
FIG. 1 is a drawing of a building equipped with a HVAC system, according to an exemplary embodiment.

Referring now to FIGS. 1-4, an exemplary building management system (BMS) and HVAC system in which the systems and methods of the present invention may be implemented are shown, according to one embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
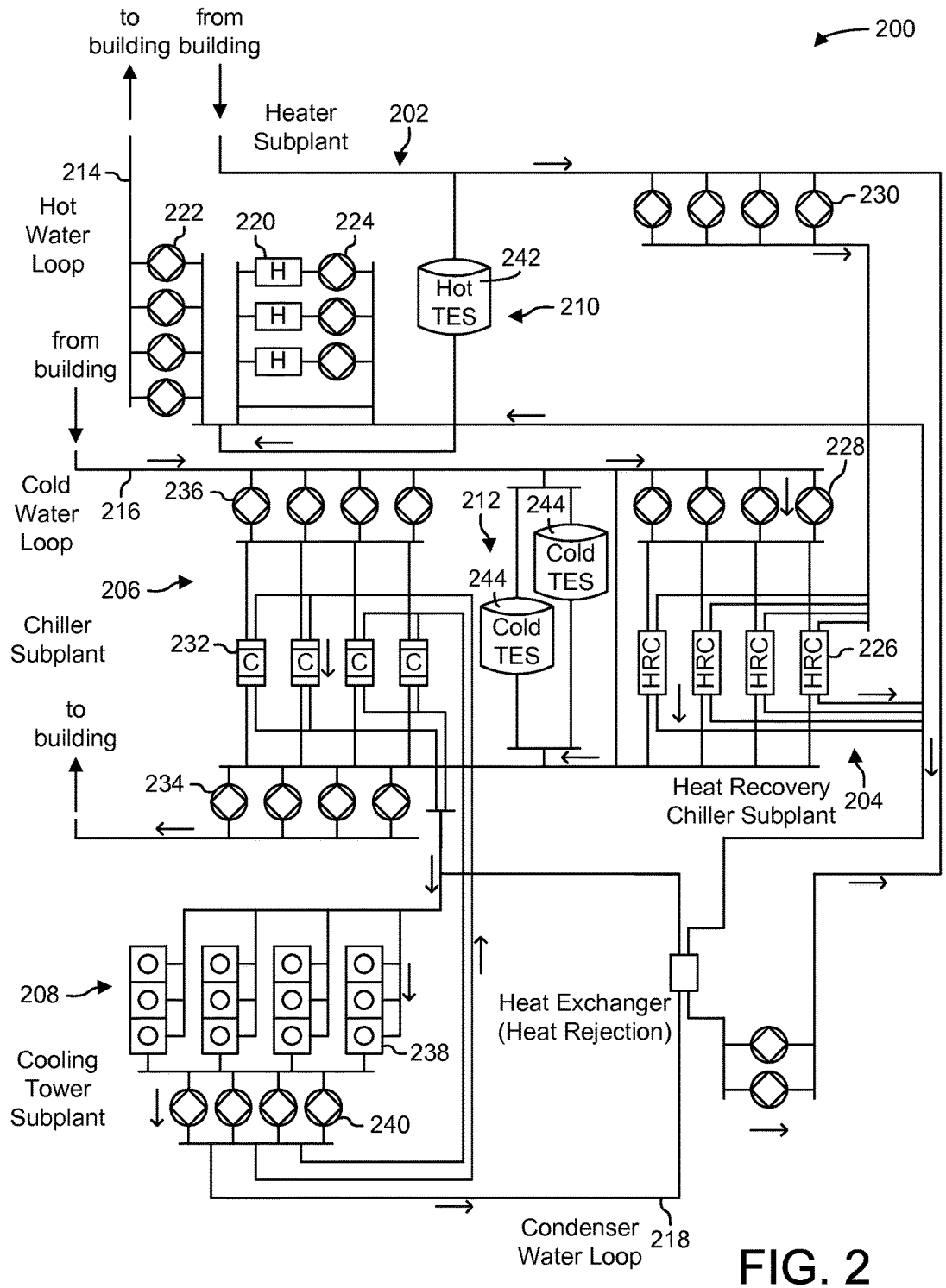
FIG. 2 is a block diagram of a waterside system that may be used in conjunction with the building of FIG. 1, according to an exemplary embodiment.

Referring now to FIG. 2, a block diagram of a waterside system 200 is shown, according to one embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
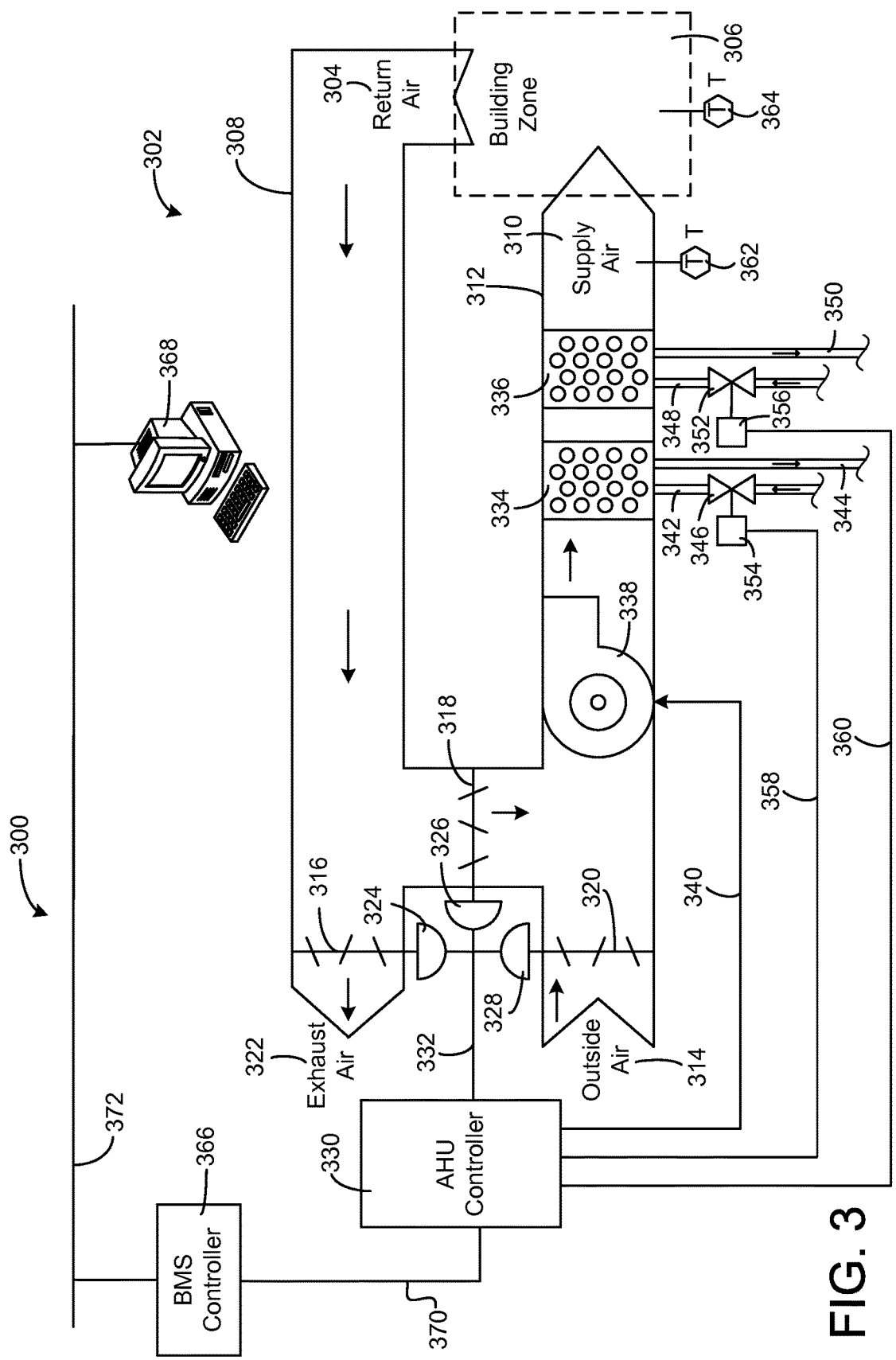
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
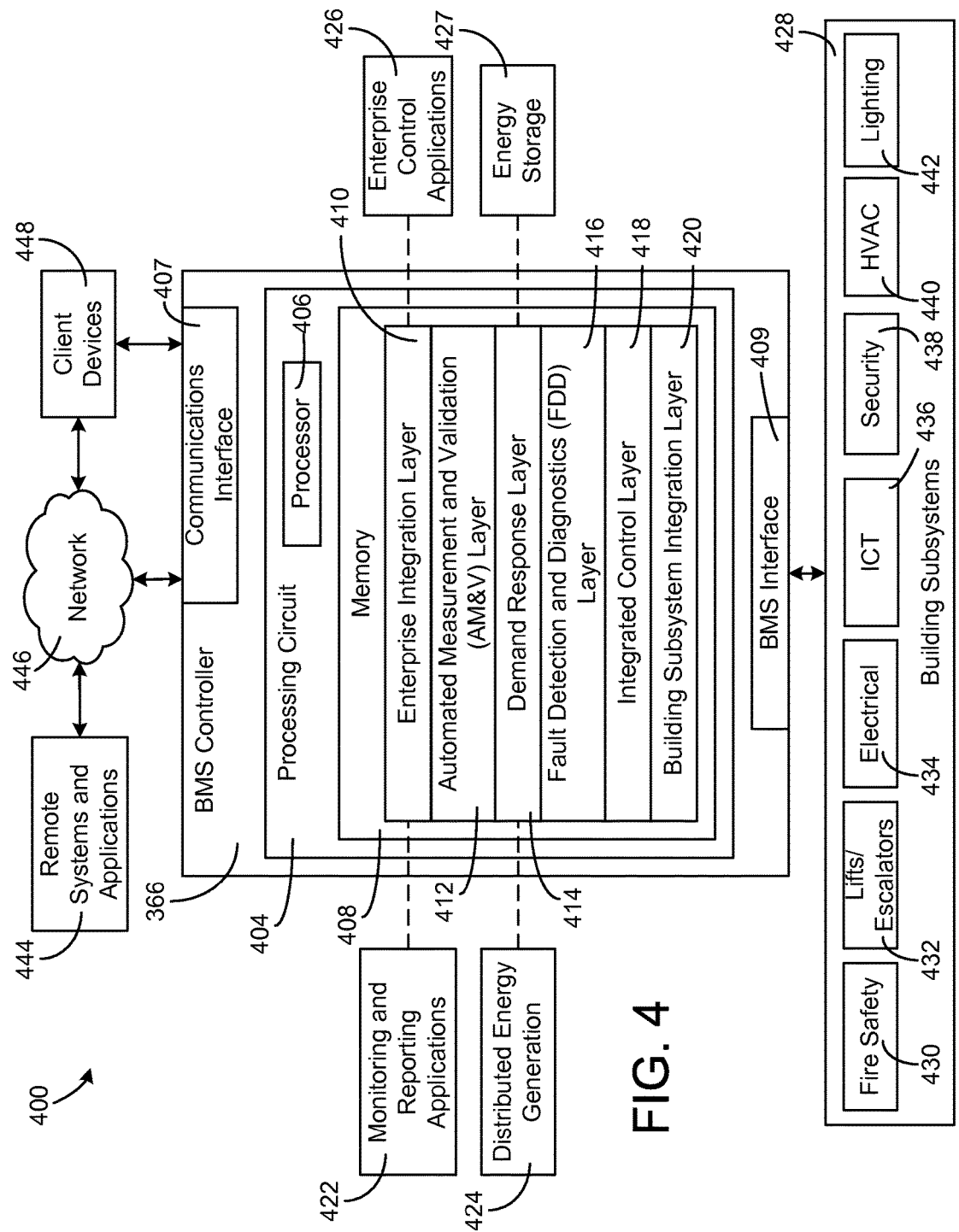
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Wireless Communication Interface Module

Figure 5:
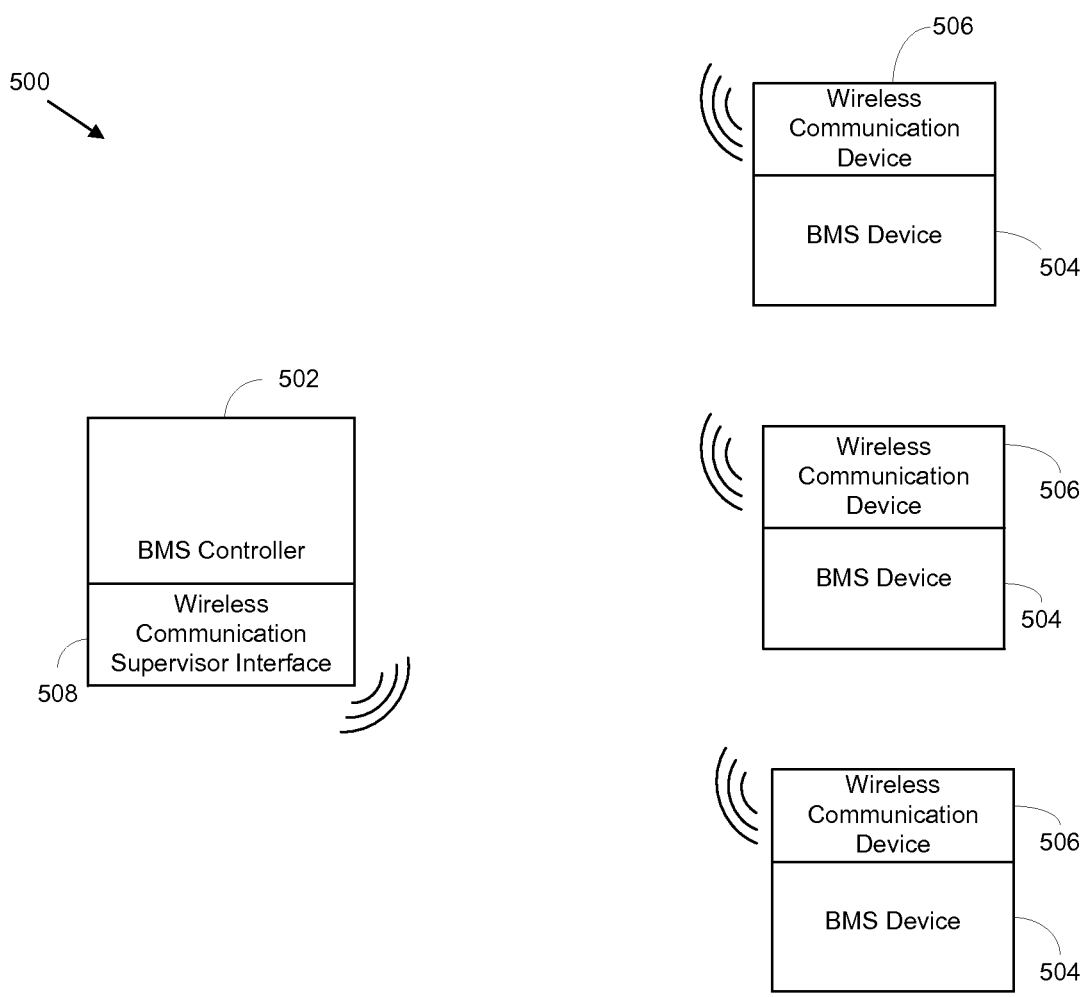
FIG. 5 is a block diagram of a BMS communication system.

Referring now to FIG. 5, a block diagram of a BMS communication system 500 is shown, according to one embodiment. The communication system 500 may include a BMS controller 502 and a number of BMS devices 504. The BMS devices 504 may be various devices typically located within a BMS. For example, the BMS devices 504 may include devices such as sensors (e.g., pressure sensors, humidity sensors, voltage sensors, current sensors, temperature sensors, or other sensors used in a BMS), remote probes (e.g. temperature probes, $CO_2$ probes, humidity probes, etc.), door and window contact switches, current transformer monitors, pulse counters, weather stations, or other BMS devices, as applicable. In one embodiment, the BMS devices 504 each interface with a wireless communication device 506. The wireless communication devices 506 may be configured to provide wireless communication to and from the BMS devices 504. In one example, the wireless communication devices 506 may be low energy wireless communication devices. In one embodiment, the wireless communication devices 506 can be a ZigBee (i.e. IEEE 802.15.4) wireless communication interface. However, other the wireless communication devices 506 may use other wireless communication protocols such as LoRa, Bluetooth Low Energy, Thread communication, cellular communication (3G, 4G, LTE, CDMA), and the like. In one embodiment, the wireless communication devices 506 utilize a 2.4 GHz Direct Sequence Spread Spectrum device to provide wireless communication to the BMS devices 504. The wireless communication devices 506 may further use a ZigBee communication protocol in conjunction with the 2.4 GHz Direct Sequence Spread Spectrum device to provide the wireless communication for the BMS devices 504.

The BMS controller 502 may be any type of BMS controller, as described above. For example, the BMS controller 502 may be a local controller configured to interface with the BMS devices 504. In some embodiments, the BMS controller 502 is a Network Automation Engine (NAE) from Johnson Controls, Inc. In one embodiment, the BMS controller 502 includes a wireless communication supervisor interface device 508. The wireless communication supervisor interface device 508 may be a ZigBee transceiver interface. In some embodiments, the wireless communication supervisor interface device 508 may be a ZigBee Coordinator device for monitoring and controlling devices on a ZigBee mesh network. The wireless communication supervisor interface device 508 can be configured to receive and or transmit data to the one or more wireless communication devices 506. The wireless communication supervisor interface device 508 may further be configured to provide data received from the one or more BMS devices 504 to the BMS controller 502. In one embodiment, the wireless communication supervisor interface device 508 may be configured to communicate with the BMS controller using a BACnet communication protocol. However, other communication protocols such as RS-485, TCP/IP, RS-232, Modbus, Universal Serial Bus (USB), Firewire, or other applicable communication protocols may be used. In some embodiments, the wireless communication supervisor interface may be configured to communicate with the BMS controller 502 using a wireless communication protocol, such as Wi-Fi, Bluetooth, LoRa, ZigBee, Thread communications, cellular (3G, 4G, LTE, CDMA), or the like. The wireless communication supervisor interface device 508 may further be configured to receive data from the BMS controller 502 for transmitting to the one or more BMS devices 504 via their associated wireless communication device 506.

In one example, the wireless communication supervisor interface device 508 can monitor and/or control up to five individual wireless interface modules. However, in some examples, the wireless communication supervisor interface device 508 can monitor and/or control more than five individual wireless interface devices 506 are also considered. The wireless communication supervisor interface device 508 may be provided as an add-on to the BMS controller 502 and communicate with the BMS controller 502 using a communication interface as described above. In one example, the wireless communication supervisor interface device 508 may have multiple analog and/or binary outputs, which can be connected directly to an I/O port of the BMS controller 502. In further embodiments, the wireless communication supervisor interface device 508 may also receive one or more inputs from the BMS controller 502, such as via one or more analog or binary outputs of the BMS controller 502.

In one embodiment, the wireless communication devices 506 can communicate with the wireless communication supervisor interface device 508 over a distance of about one-hundred feet or less. In some embodiments, the wireless communication devices 506 may be able to communicate with the wireless communication supervisor interface device 508 over a distance of about ten miles. In one embodiment, the wireless communication supervisor interface device 508 is configured to poll each of the wireless communication devices 506 individually at a predetermined interval to instruct the wireless communication devices 506 to transmit data received from an associated BMS device 504 to the BMS controller. Additionally, the wireless communication supervisor interface device 508 may be configured to poll each of the wireless communication devices 506 individually at a predetermined interval to instruct the wireless communication devices 506 to receive data and output the data to their respective BMS device 504. In one embodiment, the predetermined interval is ten seconds. However, the predetermined interval can be more than ten seconds or less than ten seconds. In other examples, the wireless communication devices 506 may be configured to transmit data to the wireless communication supervisor interface device 508 at predetermined intervals. In one embodiment, the predetermined interval can be about ten seconds. However, predetermined intervals of more than ten seconds or less than ten seconds are also contemplated. In some embodiments, the wireless communication devices 506 may be configured to transmit data to the wireless communication supervisor interface device 508 when the wireless communication device 506 detects a value change at a binary input of the wireless communication device, described below. In some embodiments, the BMS controller 502 includes a user interface for selecting the predetermined interval for data collection and for data transmission or includes a module for determining whether smaller or larger intervals are required. For example, the BMS controller 502 select intervals for data collection and data transmission based upon building schedules, occupancy information, testing routines, etc. The BMS controller 502 can select larger intervals when the building or areas associated with the building devices are unoccupied or smaller intervals when the buildings or such areas are under heavy use. In some embodiments, the BMS controller 502 runs testing routines of BMS devices and selects shorter intervals so that responses to the routines can be monitored more precisely.

Figure 6:
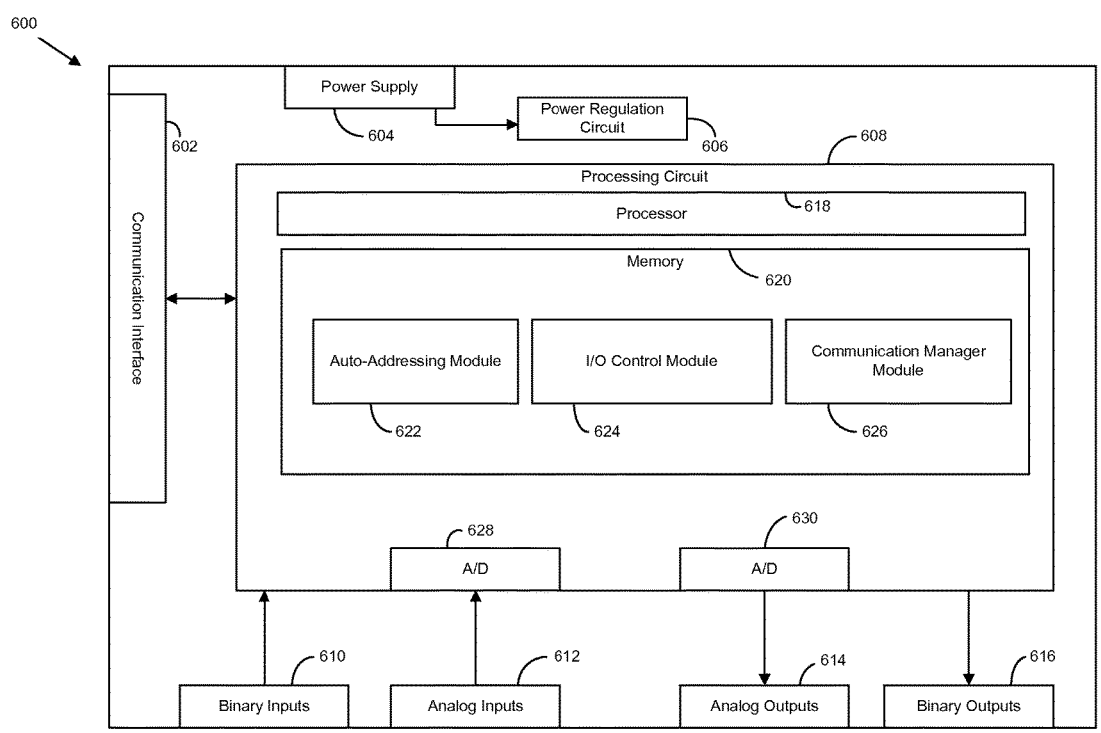
FIG. 6 is a block diagram of a wireless communication device.

FIG. 6 is a block diagram of a wireless communication device 600, as described above. The wireless communication device 600 can include a communication interface 602, a power supply 604, a power regulation circuit 606, a processing circuit 608, and a number of binary inputs 610, analog inputs 612, analog outputs 614 and binary outputs 616. The communication interface 602 may include wired or wireless interfaces (e.g. jacks, antennas, transmitters, receivers, transceivers, wire terminals, etc.) for conducting data communications with various systems, devices, or networks. For example, the communications interface 602 may include an Ethernet card and port for sending and receiving data via an Ethernet-based communications network. The communication interface 602 may be configured to communicate via local area networks or wide area networks, (e.g., the Internet, a building WAN, etc.) and may use a variety of communications protocols (e.g., BACnet, IP, LON, etc.). In one embodiment, the communication interface 602 may include one or more wireless radio transceivers. For example, the communication interface 602 may include a ZigBee transceiver. For example, the communication interface 602 may be a ZigBee RF module, such as an XB24 transceiver module from Digi International. However, other modules configured as ZigBee transceiver modules having general purpose I/O are also contemplated. In other embodiments, the communication interface 602 may include other wireless transceivers, such as a LoRa transceiver, a Bluetooth transceiver, a cellular transceiver (3G, 4G, LTE, CDMA), a Wi-Fi transceiver, a Wi-Max transceiver, or other applicable wireless transceivers.

In some embodiments, the communication interface 602 may be integrated with the processing circuit 608. For example, the communication interface 602 may be combined with the processing circuit 608 to function as a master micro-controller unit (MCU) of the wireless communication device 600. In one embodiment, the wireless communication device 600 is addressed to communicate with a wireless communication supervisor interface device, such as wireless communication supervisor interface device 508, described above. In one example, the wireless communication device 600 can be addressed using a number of DIP switches (not shown) to manually input the address of the wireless communication device 600. Alternatively, the address of the wireless communication device 600 can be set using software to directly address the wireless communication device 600, using an interface to the wireless communication device 600. For example, the wireless communication device 600 may be access and the address may be set via the communication interface 602. In other examples, the wireless communication device 600 can contain software and/or firmware allowing the wireless communication device 600 to automatically address itself (i.e. auto discovery) to a wireless communication supervisor interface device when the wireless communication device 600 detects a wireless communication supervisor interface device on a wireless network.

In one embodiment, the power supply 604 can be an external power supply, such as a power supply coupled to a BMS device that is in communication with the wireless communication device 600. For example, the external power supply 604 can be a 3-15 VDC regulated power supply. In one embodiment, the external power supply 604 is a low drop-out voltage regulator which provides a DC output of approximately 3 VDC. Alternatively, or in conjunction, the power supply 604 can be a number of batteries, such as lithium coin cell batteries. In one example, both the external power supply and the battery power supply can be used to power the wireless communication device 600. The external power supply can provide the power when the external power is available, and the battery power supply can provide power when there is a loss of the external power supply. This can allow for flexibility in installation where external power may not be available. The power regulation circuit 606 may be configured to convert a voltage received from the power supply 604 for distribution within the wireless communication device 600. In one embodiment, the power regulation circuit 606 can provide multiple voltages to various components within the wireless communication device 600. Example voltage may include ±3.3 VDC, ±5 VDC, or other required voltages.

In one example, where the power supply 604 is a battery power supply, the batteries may be lithium coin cell batteries, such as CR2477 type batteries; however, other battery types are contemplated. Where the power supply 604 relies on battery power to supply power to the wireless communication device 600, a 1000 mAh capacity battery may provide about four years of battery life to the wireless communication device 600. The battery life, however, may be affected by how often the wireless communication device 600 transmits or receives data. For example, the wireless communication device 600 may have approximately four years of battery life when data is transmitted approximately every minute. However, if the wireless communication device 600 transmits data approximately twice every minute, the expected battery life would be reduced by approximately half, resulting in a battery life of approximately two years. As the period of time between data transmissions is increased or decreased, the battery life will generally correspond proportionately. Both power supply types can couple to a 220 uF bypass capacitor to provide filtering of DC voltage. Further, a battery protection diode may be used between the batteries and the processing circuit 608 to prevent unwanted charging of the batteries. The battery protection diode can be required where both an external power supply and a battery based power supply are used, as described above.

The processing circuit 608 may include a processor 618 and a memory 620. The processor 618 may be a general purpose or specific purpose processor, an application specific integrated circuit (ASIC), one or more field programmable gate arrays (FPGAs), a group of processing components, or other suitable processing components. The processor 618 may be configured to execute computer code or instructions stored in memory 620 or received from other computer readable media (e.g., CDROM, network storage, a remote server, etc.).

The memory 620 may include one or more devices (e.g., memory units, memory devices, storage devices, etc.) for storing data and/or computer code for completing and/or facilitating the various processes described in the present disclosure. The memory 620 may include random access memory (RAM), read-only memory (ROM), hard drive storage, temporary storage, non-volatile memory, flash memory, optical memory, or any other suitable memory for storing software objects and/or computer instructions. The memory 620 may include database components, object code components, script components, or any other type of information structure for supporting the various activities and information structures described in the present disclosure. The memory 620 may be communicably connected to the processor 618 and may include computer code for executing (e.g. by processor 618) one or more processes described herein.

The memory 620 may include an auto-addressing module 622, an I/O control module 624, and a communication manager module 626. The auto-addressing module 622 may be configured to auto-address the wireless communication device 600 as described above. For example, the auto-addressing module 622 may broadcast petitions onto the network to determine an address. The auto-addressing module 622 may be configured to allow for both direct addressing and/or indirect addressing of the wireless communication device 600. Additionally, the auto-addressing module 622 may be configured to allow for group addressing for use in communicating with groups of endpoints belonging to a set of devices. The I/O control module 624 may be configured to control the various inputs and outputs of the wireless communication device 600. For example, the I/O control module 624 may control an output of the wireless communication device 600, such as analog output 614 or binary output 616. In some embodiments, the I/O control module 624 may receive an output command via the communication interface 602, process the command, and output the command to the appropriate output (e.g. analog output 614 and/or binary output 616. The I/O control module 624 may further be configured to collect data values gathered by the inputs (e.g. binary inputs 610 and analog inputs 612.

The communication manager module 626 may be configured to control communications to and from the wireless communication device 600. In one embodiment, the communication manager module 626 may only energize the communication interface 602 during certain intervals. For example, the communication manager module 626 may energize the communication interface 602 once every minute so that the communication interface 602 can send or receive data. In one embodiment, the communication manager module 626 may place the wireless communication device 600 in a low power mode between the intervals. For example, during the low power mode, the communication interface 602 may not be allowed to transmit. This can reduce the energy consumed by the wireless communication device 600, which can increase an operational life of the wireless communication device 600 where the power supply 604 is a battery. However, intervals or less than one minute or more than one minute are also contemplated. In some embodiments, the communication manager module 626 is in communication with the I/O control module 624. For example, the communication manager module 626 may instruct the I/O control module 624 to only read or write values to or from the inputs and outputs during the predefined intervals. In one embodiment, the I/O control module 624 may send an interrupt signal to the communication manager circuit 626 indicating that a binary value at the binary input 610 has changed. Upon receiving the interrupt signal, the communication manager module 626 may command the communication interface 602 to transmit the changed binary value. Further, in some embodiments, the communication interface 602 may be configured to receive a command to output a value, either via the analog output 614 or the binary output 616. The communication interface 602 may then transmit an interrupt signal to the communication manager module 626, which can then instruct the I/O control module 624 to immediately output the receive value.

In one embodiment, the communication manager module 626 is configured to instruct the communication interface 602 to transmit a power level of the power supply 604. For example, the communication manager module 626 may be configured to instruct the communication interface 602 to transmit a power level of the power supply when an analog value is being transmitted. A user may then send instructions to the wireless communication device to increase or decrease the rate at which analog values are read and transmitted. For example, if the power supply is low on available power, the wireless communication device 600 may receive instructions to increase the threshold time periods for transmitting analog values. For example, the wireless communication device 600 may receive instructions to increase a transmitting interval for analog values to every two minutes from every one minute. As stated above, this decrease in the rate of transmissions can be used to extend the power supply 604 of the wireless communication device 600. In further embodiments, the power regulation circuit 606 may provide power supply information to the processing circuit, which can automatically determine if the transmission intervals for analog values should be increased or decreased. Any determined increase or decrease in the transmission intervals may be transmitted to a BMS controller via the communication interface.

As described above, the wireless communication device 600 can further include multiple inputs and outputs (I/O) (e.g. binary inputs 610, analog inputs 612, analog outputs 614, and binary outputs 616) The I/O may be used for monitoring or controlling one or more devices, such as BMS device 504, described above. In one embodiment, the I/O can be general purpose I/O (GPIO) ports which can be configured to work as analog inputs/outputs and/or binary (digital) inputs/outputs. Alternatively, the RF module may include dedicated analog I/O ports, 612, 614 and/or dedicated binary I/O ports 610, 616. As described above, the I/O control module 624 can control and monitor all of the I/O on the wireless communication device.

The binary inputs 610 may be configured to receive one or more binary signals (e.g. logic high and logic low). The wireless communication device 600 may include from one to as many binary inputs 610 as the processing circuit 608 can support. In one embodiment, the binary inputs 610 are connected to the processing circuit via a pull-up resistor paired with a debounce capacitor. The debounce capacitor may be used to "smooth" or remove any signal bounce associated the binary input 610. For example, the debounce capacitor may be used where the binary input 610 is provided by a mechanical contact, such as a relay, contactor, switch, etc. The pull up resistor may be sized to appropriately elicit the lowest current draw while the mechanical contact is held in the "closed" position while still having good response to logic level changes. In one embodiment, the pull up resistor is a 1 MΩ resistor. In one example, the mechanical contact is a dry mechanical contact. The binary inputs 610 can be used for coil monitoring, dirty filter statuses, fan statuses, etc. The binary inputs 610 may be configured to work on multiple different voltage levels, such as 0-5 VDC, 0-3.3 VDC, or other applicable inputs.

The analog inputs 612 can number from one to as many as the processing circuit 608 can support. In one embodiment, the analog inputs 612 are connected to the processing circuit 608 through a resistor divider network with a scaling factor to provide the proper analog levels to the processing circuit 608. For example, the scaling factor may be 0.33. Where the scaling factor is established as 0.33, a 10 VDC signal can be used to provide a full range signal (e.g. 0-3 VDC) to an analog-to-digital converter 628 (A/D) in the processing circuit 608. The A/D 628 may be configured to convert the received analog input values into a digital value for processing and transmission via the communication interface 602. The A/D 628 may be an 8-bit, 16-bit, 24-bit or other applicable analog-to-digital input device. A buffer amplifier can further be provided on the output of the divider network to reduce any potential loading effects of the processing circuit 608 input connections. In some embodiments, the input is a 4-20 mA signal. Where the input is a 4-20 mA signal, a converter circuit may be provided to convert the 4-20 mA signal to a 0-3 VDC output, which can be interpreted by the A/D 628 of the processing circuit. The analog inputs 612 may be resistive analog inputs. In some embodiments, the analog inputs 612 may be configured as single ended or differential 4-20 mA inputs, 0-20 mA inputs, or 0-10 VDC inputs.

The analog outputs 614 can number from one to as many as the processing circuit 608 can support. The analog outputs 614 may be similarly configured to the analog inputs 612, described above. For example, the analog outputs 614 may be configured as single ended or differential 4-20 mA outputs, 0-20 mA outputs, or 0-10 VDC outputs. In one embodiment, the analog outputs 614 are coupled to an analog-to-digital converter output 630 of the processing circuit 608. The analog-to-digital converter output 630 may convert a digital data value, such as a digital data value received via the communication interface 602, into an analog value for output by the analog outputs 614. In one embodiment, the output may be provided to the analog outputs 614 by the I/O control module 624.

In one embodiment, the wireless communication device 600 can include from one to as many binary outputs 616 as the processing circuit 608 can support. In one embodiment, the binary outputs 616 consist of a low-power solid-state single-pull-single-throw (SPST) relay with the relay coil connections being driven by the processing circuit 608, such as via I/O control module 624. Alternatively, other types of binary outputs 616 are considered, such as mechanical latching relays, digital flip flops, etc. In one embodiment, the binary outputs 616 are used to provide a binary signal to a BMS device coupled to the wireless communication device 600. Example BMS devices may include lighting circuits, control circuits, valves, AHUs, VAVs, etc. The binary outputs 616 may be configured to output one or more output values. In other embodiments, the binary outputs 616 may be logic outputs (e.g. 0-5 VDC or 0-3.3 VDC outputs).

Figure 7:
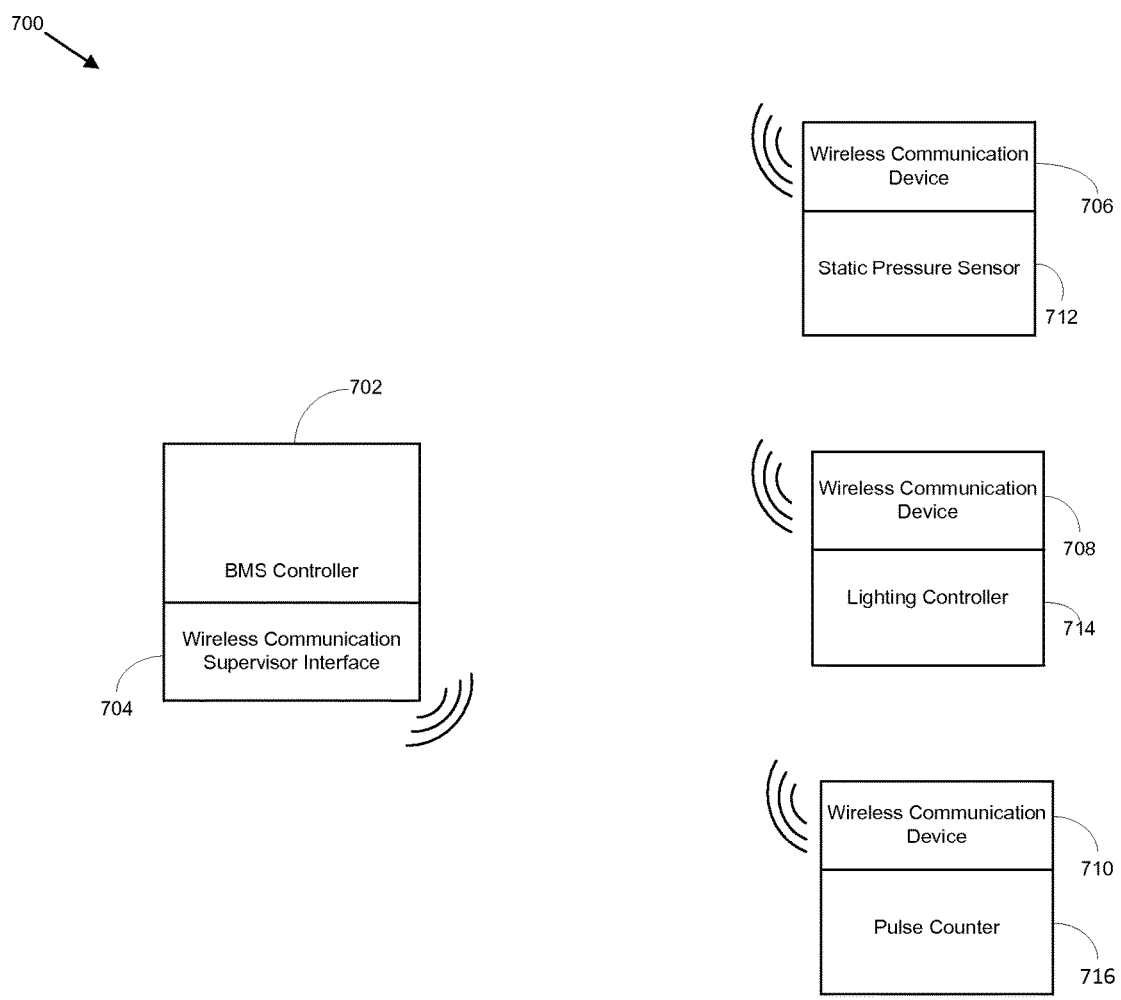
FIG. 7 is a block diagram of a BMS communication system with multiple BMS devices.

Turning now to FIG. 7, a BMS system 700 is shown, according to some embodiments. The BMS system 700 may include a BMS controller 702. The BMS controller 702 may be any BMS controller as described above. The BMS controller 702 may be coupled to a wireless communication supervisor interface device 704. In one embodiment, the wireless communication supervisor interface device 704 may be similar to the wireless communication supervisor interface device 508 described above. The wireless communication supervisor interface device 704 may be configured to provide communication between the BMS controller 702 and one or more wireless communication devices 706, 708, 710. The wireless communication devices 706, 708, 710 may be configured as wireless communication device 600, described above.

The wireless communication device 706 may be coupled to a static pressure sensor 712. The static pressure sensor 712 may be located with a duct associated with an HVAC system of a building. The static pressure sensor 712 may provide an analog value to an analog input of the wireless communication device 706. In one embodiment, the wireless communication device 706 may convert the analog value provided by the static pressure sensor 712 into a digital value, and transmit the digital value to the wireless communication supervisor interface device 704. In one embodiment, the wireless communication device 706 communicates with the wireless communication supervisor interface device 704 via a ZigBee protocol (IEEE 802.15.4). In some embodiments, the wireless communication device 706 may read a value output by the static pressure sensor 712 at predetermine intervals. In one embodiment, the predetermined interval may be one minute. However, other interval values are also contemplated. Between the predetermined intervals, the wireless communication device 706 may enter a low-power mode as described above.

The wireless communication device 708 may be coupled to a lighting controller 714. The lighting controller 714 may control one or more lighting devices in a building. The wireless communication device 708 may be configured to receive a binary input from the lighting controller 714, and provide a binary output to the lighting controller 714. In one embodiment, the wireless communication device 708 is configured to receive a binary value from the wireless communication supervisor interface device 704. The binary value may indicate an on or off command for the lighting controller 714. Upon receiving the binary value from the wireless communication supervisor interface device 704, the wireless communication device 708 may output the value to the lighting controller 714 via a binary output of the wireless interface controller 08. The lighting controller 714 may provide one or more binary inputs to the wireless communication device 708 via a binary input of the wireless communication device 708. For example, the lighting controller 714 may output a binary value indicating whether one or more lighting devices associated with the lighting controller 714 are energized. The wireless communication device 708 may then transmit the received binary value to the wireless communication supervisor interface device 704 using a wireless communication protocol, such as ZigBee (IEEE 802.15.4). In some embodiment, the wireless communication device 708 is configured to remain in a low power mode until a binary value change from the lighting controller 714 is detected at a binary input of the wireless communication device, or a command to output a binary value is received by from the wireless communication supervisor interface device 704.

The wireless communication device 710 may be coupled to a pulse counter 716. In some embodiments, the pulse counter 716 may be associated with an energy meter. The pulse counter 716 may output a binary value change for every pulse counted. The wireless communication device 710 may receive the binary value change outputs from the pulse counter 716 at a binary input of the wireless communication device 710. The wireless communication device 710 may be configured to store the binary value changes in a memory, and transmit a count of the binary value changes received to the wireless communication supervisor interface device 704 at predetermined intervals. For example, the wireless communication device 710 may be configured to transmit the count every fifteen minutes. However, predetermined intervals of more than fifteen minutes or less than fifteen minutes are also contemplated.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A wireless monitoring system for a Building Management System (BMS), the system comprising:
   a sensing device configured to sense a value of an attribute associated with the BMS;
   a wireless communication module in communication with the sensing device and configured to receive one or more sensed values from the sensing device at one or more analog inputs of the wireless communication module and receive a binary signal at one or more binary inputs of the wireless communication module; and
   a wireless transceiver in communication with a BMS controller, wherein the wireless transceiver is configured to receive the sensed values from the wireless communication module, and wirelessly transmit the sensed values to the BMS controller via a wireless protocol;
   wherein the wireless communication module is configured to:
      transition from operating in a low power mode to operating in a standard mode in response to detecting a change in value of the binary signal at the one or more binary inputs; and
      transmit the sensed values upon transitioning into the standard mode.

2. The system of claim 1, wherein the sensing device is a static pressure sensor or a temperature sensor.

3. The system of claim 1, wherein the wireless communication module is configured to:
   operate in the low power mode during which the sensed values are not transmitted by the wireless communication module;
   operate in the standard mode during which the sensed values are transmitted by the wireless communication module via the wireless protocol.

4. The system of claim 1, wherein the wireless communication module comprises at least one of an analog input circuit and a binary input circuit.

5. The system of claim 1, wherein the wireless protocol is an IEEE 802.15.4 protocol.

6. The system of claim 1, wherein the wireless communication module is further configured to transmit an indication of the change in value of the binary signal via the wireless transceiver.

7. A system for remotely sensing a static pressure in an HVAC system, comprising:
   a static pressure sensing device positioned within an air handling duct associated with the HVAC system;
   a wireless communication module in electronic communication with the static pressure sensing device and configured to receive a sensed pressure value from the static pressure sensing device via an analog input of the wireless communication module, to receive a binary signal via a binary input of the wireless communication module, and to transmit the sensed pressure value via a wireless protocol; and
   wherein the wireless communication module is configured to:
      transition from operating in a low power mode to operating in a standard mode in response to detecting a change in value of the binary signal at the binary input; and
      transmit the sensed pressure value upon transitioning into the standard mode.

8. The system of claim 7, wherein the wireless communication module is further configured to transmit an indication of the change in value of the binary signal via the wireless protocol.

9. The system of claim 7, wherein the binary input is configured to receive one or more binary data values from the static pressure sensing device.

10. The system of claim 7, wherein the wireless communication module is further configured to output data to the static pressure sensing device via an output.

11. The system of claim 10, wherein the output is one or more of a binary output and an analog output.

12. The system of claim 10, wherein the wireless communication module may receive an instruction to output data to the static pressure sensing device from a BMS controller via the wireless protocol.

13. The system of claim 7, wherein the wireless communication module is further configured to:
operate in the low power mode during which the sensed pressure value is not transmitted by the wireless communication module;
operate in the standard mode during which the sensed pressure value is transmitted by the wireless communication module via the wireless protocol.

14. A wireless communication module for providing wireless communication to HVAC equipment, comprising
a wireless radio;
a power supply;
one or more analog inputs in communication with the HVAC equipment;
one or more binary inputs in communication with the HVAC equipment; and
a processing circuit comprising a processor configured to:
read one or more analog values provided by the HVAC equipment at the one or more analog inputs;
operate the wireless communication module in a low power mode;
operate the wireless communication module in a standard mode;
transition from the low power mode to the standard mode when a value change is detected at the one or more binary inputs; and
transmit the one or more analog values via the wireless radio upon transitioning into the standard mode.

15. The module of claim 14, wherein the processor is further configured to:
receive data via the wireless radio; and
transmit the received data to the HVAC device via an output of the wireless communication module coupled to an input of the HVAC device.

16. The module of claim 15, wherein the output is at least one of a digital output and an analog output.

17. The module of claim 14, wherein the low power mode is configured to reduce the amount of power drawn from the power supply by the wireless radio.

18. The module of claim 14, wherein the processor is further configured to:
operate the wireless communication module in the low power mode during which the one or more analog values are not transmitted by the wireless communication module; and
operate the wireless communication module in the standard mode during which the one or more analog values are transmitted by the wireless communication module at a predetermined interval.

19. The module of claim 18, wherein the predetermined interval is one minute.

20. The module of claim 14, wherein the processor is further configured to transmit the binary value change via the wireless radio.

* * * * *